(12) United States Patent
Nishizaki et al.

(10) Patent No.: US 11,309,125 B2
(45) Date of Patent: Apr. 19, 2022

(54) POWER TRANSMISSION UNIT AND POWER TRANSMISSION COIL

(71) Applicant: Yazaki Corporation, Tokyo (JP)

(72) Inventors: Ryohei Nishizaki, Shizuoka (JP);
Takashi Shiroki, Shizuoka (JP);
Takahiro Nakahara, Shizuoka (JP);
Takayuki Ueda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 574 days.

(21) Appl. No.: 15/984,987

(22) Filed: May 21, 2018

(65) Prior Publication Data

US 2018/0366263 A1 Dec. 20, 2018

(30) Foreign Application Priority Data

Jun. 14, 2017 (JP) .............................. JP2017-116848
Jun. 14, 2017 (JP) .............................. JP2017-116849
Jun. 14, 2017 (JP) .............................. JP2017-116850

(51) Int. Cl.
| | |
|---|---|
| H01F 27/36 | (2006.01) |
| H01F 27/28 | (2006.01) |
| H01F 27/30 | (2006.01) |
| H02J 7/02 | (2016.01) |
| H01F 38/14 | (2006.01) |
| H02J 50/12 | (2016.01) |
| H02J 50/70 | (2016.01) |
| H01F 41/064 | (2016.01) |

(Continued)

(52) U.S. Cl.
CPC .............. *H01F 27/36* (2013.01); *B60L 53/12* (2019.02); *H01F 27/02* (2013.01); *H01F 27/288* (2013.01); *H01F 27/2823* (2013.01); *H01F 27/2871* (2013.01); *H01F 27/30* (2013.01); *H01F 27/306* (2013.01); *H01F 38/14* (2013.01); *H01F 41/064* (2016.01); *H02J 7/025* (2013.01); *H02J 50/12* (2016.02); *H02J 50/70* (2016.02); *H04B 5/0037* (2013.01); *H01F 2027/2838* (2013.01)

(58) Field of Classification Search
CPC .......... H01F 27/36; H01F 38/14; H02J 50/20; H02J 50/80; H02J 7/025; H04L 69/323
USPC ....................................................... 307/104
See application file for complete search history.

(56) References Cited

U.S. PATENT DOCUMENTS 9,711,995 B2 * 7/2017 Yuasa ..................... H02J 7/025
10,658,870 B2 * 5/2020 Jang ......................... H01F 27/36
(Continued)

FOREIGN PATENT DOCUMENTS

| CN | 104485759 A | 4/2015 |
| EP | 3 041 007 A1 | 7/2016 |

(Continued)

*Primary Examiner* — Alfonso Perez Borroto
(74) *Attorney, Agent, or Firm* — Sughrue Mion, PLLC (57) ABSTRACT

A power transmission unit includes: a power transmission coil; a communication coupler that is formed in an annular shape about an axis X and arranged to surround the power transmission coil; and a shielding member that is formed in an annular shape about the axis X, and arranged between the power transmission coil and the communication coupler in an intersecting direction. The shielding member is arranged at a position along the intersecting direction to surround the power transmission coil, and shields magnetic force generated by the power transmission coil.

4 Claims, 8 Drawing Sheets

| EXAMINED PATTERN | PATTERN 1 | PATTERN 2 | PATTERN 3 | PATTERN 4 | PATTERN 5 |
|---|---|---|---|---|---|
| NUMBER OF WINDINGS OF ANTENNA WIRE | 3 TURNS | 3 TURNS | 3 TURNS | 3 TURNS | 3 TURNS |
| S11 | -1.2 dB | -7.8 dB | -20.9 dB | -2.1 dB | -8.9 dB |

(51) Int. Cl.
 B60L 53/12 (2019.01)
 H01F 27/02 (2006.01)
 H04B 5/00 (2006.01)

(56) References Cited

U.S. PATENT DOCUMENTS

| | | | |
|---|---|---|---|
| 10,872,722 B2* | 12/2020 | Wambugu Ngahu | H01F 27/36 |
| 2013/0038278 A1 | 2/2013 | Park et al. | |
| 2014/0306655 A1 | 10/2014 | Hasegawa et al. | |
| 2015/0244181 A1* | 8/2015 | Kagami | H02J 7/025 |
| | | | 307/104 |
| 2015/0279555 A1* | 10/2015 | Chiyo | H01F 38/14 |
| | | | 307/104 |
| 2015/0332841 A1 | 11/2015 | Sadakata et al. | |
| 2015/0364924 A1 | 12/2015 | Yuasa | |
| 2016/0114687 A1* | 4/2016 | Ichikawa | H02J 7/025 |
| | | | 701/22 |
| 2016/0164333 A1* | 6/2016 | Hatakeyama | H02J 50/90 |
| | | | 320/108 |
| 2016/0352138 A1* | 12/2016 | Hirobe | H01Q 7/00 |
| 2017/0264131 A1* | 9/2017 | An | H02J 50/10 |
| 2018/0137970 A1* | 5/2018 | Doi | H02J 7/025 |
| 2018/0262062 A1* | 9/2018 | Kato | H02J 50/12 |
| 2019/0123584 A1* | 4/2019 | Yoshizawa | H02J 50/40 |
| 2019/0267830 A1* | 8/2019 | An | H01F 27/2804 |

FOREIGN PATENT DOCUMENTS

| | | |
|---|---|---|
| JP | H04139709 A | 5/1992 |
| JP | 2011010435 A | 1/2011 |
| JP | 2013021902 A | 1/2013 |
| JP | 2014-53366 A | 3/2014 |
| JP | 2014-113021 A | 6/2014 |
| JP | 2014120325 A | 6/2014 |
| JP | 2014207366 A | 10/2014 |
| JP | 2016-001940 A | 1/2016 |
| JP | 2016-59174 A | 4/2016 |
| JP | 2016-092214 A | 5/2016 |
| JP | 2016103612 A | 6/2016 |
| WO | 2013099221 A1 | 7/2013 |

* cited by examiner

POWER TRANSMISSION UNIT AND POWER TRANSMISSION COIL

CROSS-REFERENCE TO RELATED APPLICATION(S)

The present application claims priority to and incorporates by reference the entire contents of Japanese Patent Application No. 2017-116848 filed in Japan on Jun. 14, 2017, Japanese Patent Application No. 2017-116849 filed in Japan on Jun. 14, 2017 and Japanese Patent Application No. 2017-116850 filed in Japan on Jun. 14, 2017.

BACKGROUND OF THE INVENTION

1. Field of the Invention

The present invention relates to a power transmission unit and a power transmission coil.

2. Description of the Related Art

Conventionally, there is known a power transmission unit having a function of transmitting electric power in a non-contact manner and a function of performing wireless communication. For example, the power transmission unit includes a power transmission coil, a coil antenna, and a shielding member including a recessed part on which the coil antenna is arranged (for example, refer to Japanese Patent Application Laid-open No. 2016-92214). The power transmission unit prevents communication quality of the coil antenna from being deteriorated by shielding magnetic force generated by the power transmission coil with a shielding member.

The power transmission unit may use an annular communication antenna having a larger diameter size than that of the coil antenna described above. In this case, the power transmission unit needs to prevent the size of the unit from being increased and prevent magnetic force caused by the power transmission coil from influencing communication. From this viewpoint, there is room for improvement.

SUMMARY OF THE INVENTION

The present invention is made in view of such a situation, and aims to provide a power transmission unit and a power transmission coil that can prevent the size of the unit from being increased and prevent communication quality from being deteriorated.

In order to solve the above mentioned problem and achieve the object, a power transmission unit according to one aspect of the present invention includes a power transmission coil that transmits electric power in a non-contact manner; a communication part that is formed in an annular shape about an axis, arranged to surround the power transmission coil, and transmits and receives a signal; and a shielding member that is formed in an annular shape about the axis, arranged between the power transmission coil and the communication part in an intersecting direction intersecting with the axis, and shields magnetic force generated by the power transmission coil.

According to another aspect of the present invention, in the power transmission unit, it is preferable to further include a magnetic member that is arranged on the power transmission coil and includes a magnetic material; a substrate that includes a circuit and is electrically connected to the power transmission coil; an inner member that defines a relative position of the substrate, the power transmission coil, the magnetic member, the shielding member, and the communication part so as to allow transmission of electric power with a counterpart power transmission coil and allow communication with a counterpart communication part, the inner member to which the substrate, the power transmission coil, the magnetic member, the shielding member, and the communication part are assembled; and an outer member that covers the inner member to which the substrate, the power transmission coil, the magnetic member, the shielding member, and the communication part are assembled.

According to still another aspect of the present invention, in the power transmission unit, it is preferable that the inner member includes: a supporting plate arranged to intersect with the axis; an erected wall part that is erected from the supporting plate to be arranged in an annular shape about the axis, and includes the communication part wound around an outer face of the erected wall part to be mounted on the outer face and the shielding member mounted on an inner face; and a housing chamber that is arranged inside the erected wall part, includes a space part, and houses the power transmission coil and the magnetic member in the space part.

According to still another aspect of the present invention, in the power transmission unit, it is preferable that the shielding member includes a shield wall part that is arranged at a position along the intersecting direction to surround the power transmission coil so as to shield magnetic force generated by the power transmission coil, and the shield wall part is formed such that a gap between wall surfaces opposed to each other in the intersecting direction is widened from one side toward the other side of an axial direction along the axis.

According to still another aspect of the present invention, in the power transmission unit, it is preferable that the power transmission coil includes: a coil winding part in which a conductor wire is arranged in a spiral shape about the axis; a winding start end part as an end of the conductor wire on a winding start side; and a winding finish end part as an end of the conductor wire on a winding finish side, wherein a thickness of the coil winding part in the axial direction along the axis is smaller than an outer diameter of the winding start end part and an outer diameter of the winding finish end part.

According to still another aspect of the present invention, in the power transmission unit, it is preferable that the conductor wire is a litz wire obtained by intertwisting a plurality of conductor elemental wires.

According to still another aspect of the present invention, in the power transmission unit, it is preferable that the winding start end part and the winding finish end part are positioned outside or inside the coil winding part when viewed from the axial direction.

According to still another aspect of the present invention, in the power transmission unit, it is preferable that the conductor wire of the coil winding part is coated with an adhesive member.

In order to achieve the object, a power transmission unit according to still another aspect of the present invention includes a power transmission coil that transmits electric power in a non-contact manner; a substrate that includes a circuit and is electrically connected to the power transmission coil; a magnetic member that is arranged on the power transmission coil and includes a magnetic material; an inner member that defines a relative position of the substrate, the power transmission coil, and the magnetic member so as to allow transmission of electric power with a counterpart power transmission coil, the inner member to which the substrate, the power transmission coil, and the magnetic member are assembled; and an outer member that covers the inner member to which the substrate, the power transmission coil, and the magnetic member are assembled.

According to still another aspect of the present invention, in the power transmission unit, it is preferable that a shielding member that shields magnetic force of the power transmission coil; and a communication part that transmits and receives a signal, wherein the inner member defines a relative position of the shielding member and the communication part so as to allow communication with a counterpart communication part, the inner member to which the shielding member and the communication part are assembled.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a mode for carrying out the invention (embodiment) in detail with reference to the drawings. The present invention is not limited to the embodiment described below. Components described below include a component that is easily conceivable by those skilled in the art and components that are substantially the same. The components described below can be appropriately combined. The components can be variously omitted, replaced, or modified without departing from the gist of the present invention.

Embodiment

The following describes a power transmission unit 1 according to an embodiment. The power transmission unit 1 is a unit that transmits electric power in a non-contact manner and wirelessly communicates a signal. The power transmission unit 1 functions as a power transmission side for transmitting electric power, or a power reception side for receiving electric power. For example, the power transmission unit 1 is used in a case of charging a storage battery mounted in a vehicle (not illustrated). In this case, the power transmission unit 1 on the power reception side is, for example, installed on a bottom face part of the vehicle, and connected to the storage battery of the vehicle. The power transmission unit 1 on the power transmission side is, for example, installed on the ground of a charging station (not illustrated), and connected to a power supply. The power transmission unit 1 on the power transmission side transmits the electric power supplied from the power supply to the power transmission unit 1 on the power reception side by magnetic resonance and the like in a state of being opposed to the power transmission unit 1 on the power reception side. The power transmission unit 1 on the power reception side receives the electric power transmitted from the power transmission unit 1 on the power transmission side, and outputs the received electric power to the storage battery of the vehicle. In the following description, a main configuration of the power transmission unit 1 is the same between the power transmission side and the power reception side, so that the following describes the power transmission side and the power reception side without distinguishing therebetween unless specifically mentioned.

Figure 1:
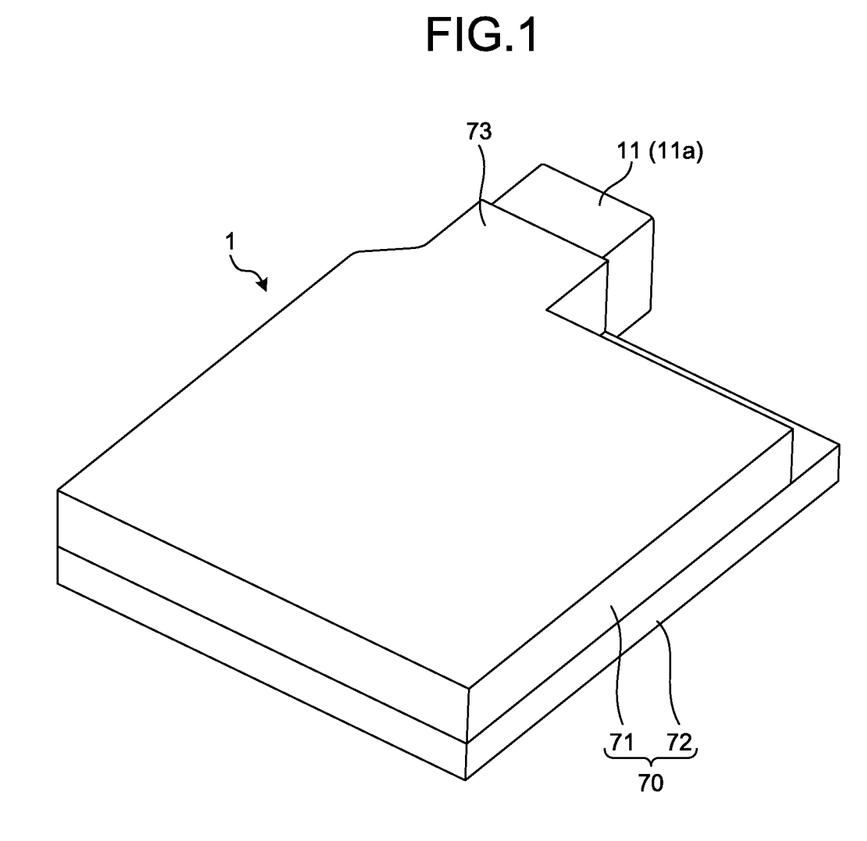
FIG. 1 is a perspective view illustrating a configuration example of a power transmission unit according to an embodiment.
Figure 2:
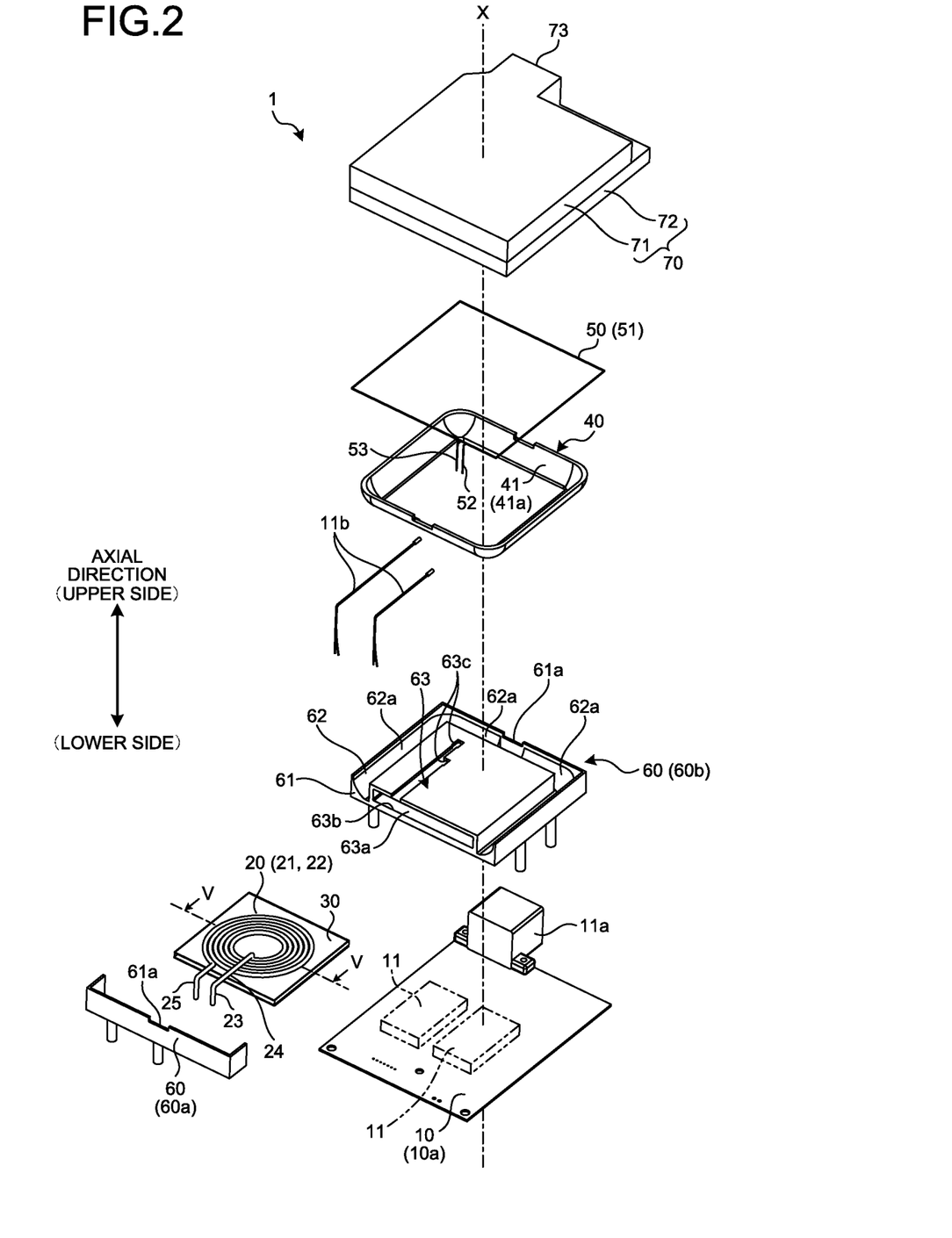
FIG. 2 is an exploded perspective view illustrating a configuration example of the power transmission unit according to the embodiment.

As illustrated in FIGS. 1 and 2, the power transmission unit 1 includes a substrate 10, a power transmission coil 20, ferrite 30 serving as a magnetic member, a shielding member 40, a communication coupler 50 serving as a communication part, an inner case 60 serving as an inner member, and an outer case 70 serving as an outer member.

Herein, an axial direction is a direction along an axis X. An upper side of the axial direction is the power transmission coil 20 side, and a lower side of the axial direction is the substrate 10 side. An intersecting direction is a direction intersecting with the axial direction. An orthogonal direction is a direction orthogonal to the axial direction.

The substrate 10 is what is called a printed circuit board on which various electronic components 11 such as a resonance capacitor are mounted, which constitutes an electronic circuit that electrically connects the electronic components 11 with each other. In the substrate 10, for example, a wiring pattern (print pattern) is formed with a conductive member such as copper foil on an insulating layer constituted of an insulating material such as an epoxy resin, a glass epoxy resin, a paper epoxy resin, ceramic, and the like. The substrate 10 is electrically connected to the power transmission coil 20.

The power transmission coil 20 is a coil that transmits electric power in a non-contact manner. The power transmission coil 20 constitutes an LC resonance circuit together with a resonance capacitor. The power transmission coil 20 includes, for example, a coil winding part 22 in which a conductor wire 21 is arranged about the axis X in a spiral shape, a winding start end part 23 that is an end on a winding start side of the conductor wire 21, an intermediate part 24 as a portion between the winding start end part 23 and the coil winding part 22, and a winding finish end part 25 that is an end on a winding finish side of the conductor wire 21. The conductor wire 21 is, for example, a litz wire obtained by intertwisting a plurality of conductor elemental wires. The coil winding part 22 is a portion formed in a spiral shape that is wound from the inside toward the outside a plurality of times along the intersecting direction intersecting with the axial direction. Typically, the coil winding part 22 is wound from the inside toward the outside a plurality of times along the orthogonal direction orthogonal to the axial direction. The intermediate part 24 is a portion that the conductor wire 21 traverses from the inside toward the outside of the coil winding part 22. The intermediate part 24 is compressed along the axial direction and fixed to the coil winding part 22 with an adhesive member. The winding start end part 23 and the winding finish end part 25 are positioned outside the coil winding part 22 when viewed from the axial direction. The winding start end part 23 and the winding finish end part 25 are connected to the substrate 10.

Figure 3:
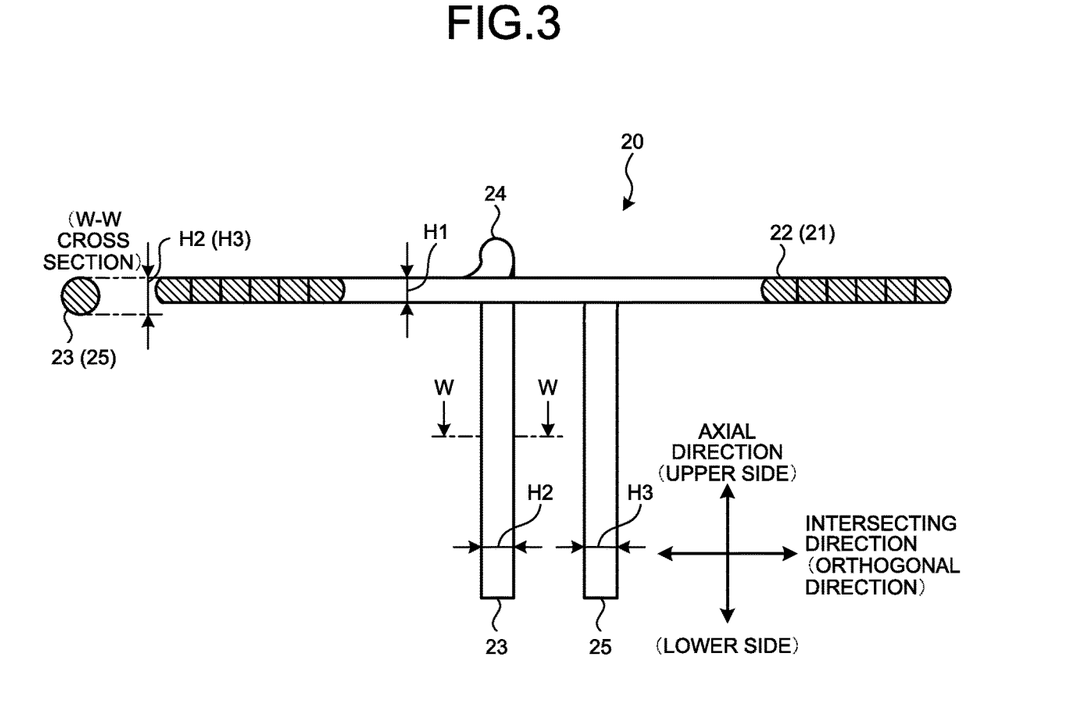
FIG. 3 is a cross-sectional view along V-V of FIG. 2 illustrating a configuration example of a power transmission coil according to the embodiment.

In the coil winding part 22, as illustrated in FIG. 3, the conductor wire 21 is compressed along the axial direction, and the conductor wire 21 is coated and fixed with the adhesive member. Accordingly, in the coil winding part 22, a cross-sectional shape of the conductor wire 21 is deformed, and a space between adjacent pieces of the conductor wire 21 is closed to form the conductor wire 21 in a plate shape. As a result, the power transmission coil 20 is configured such that a thickness H1 in the axial direction of the coil winding part 22 is smaller than an outer diameter H2 of the winding start end part 23 (for example, a W-W cross section) and an outer diameter H3 of the winding finish end part 25. Due to this, the power transmission coil 20 can suppress fluctuation in a coil shape, and can reduce a tolerance of an inductance value. Thus, the power transmission coil 20 can suppress fluctuation in coil performance, and can secure appropriate coil performance. The power transmission coil 20 is formed by winding one conductor wire 21, so that the thickness of the outer diameter H2 of the winding start end part 23 is equal to the thickness of the outer diameter H3 of the winding finish end part 25.

The ferrite 30 is a member including a magnetic material, and is complex oxide of iron oxide and metal, for example. The ferrite 30 is, for example, formed in a rectangular plate shape, and formed to have a size equal to that of the power transmission coil 20. The ferrite 30 is arranged on the power transmission coil 20 to be opposed to the power transmission coil 20 along the axial direction. The ferrite 30 passes magnetic force generated by the power transmission coil 20 to prevent the magnetic force from being lost.

Figure 4:
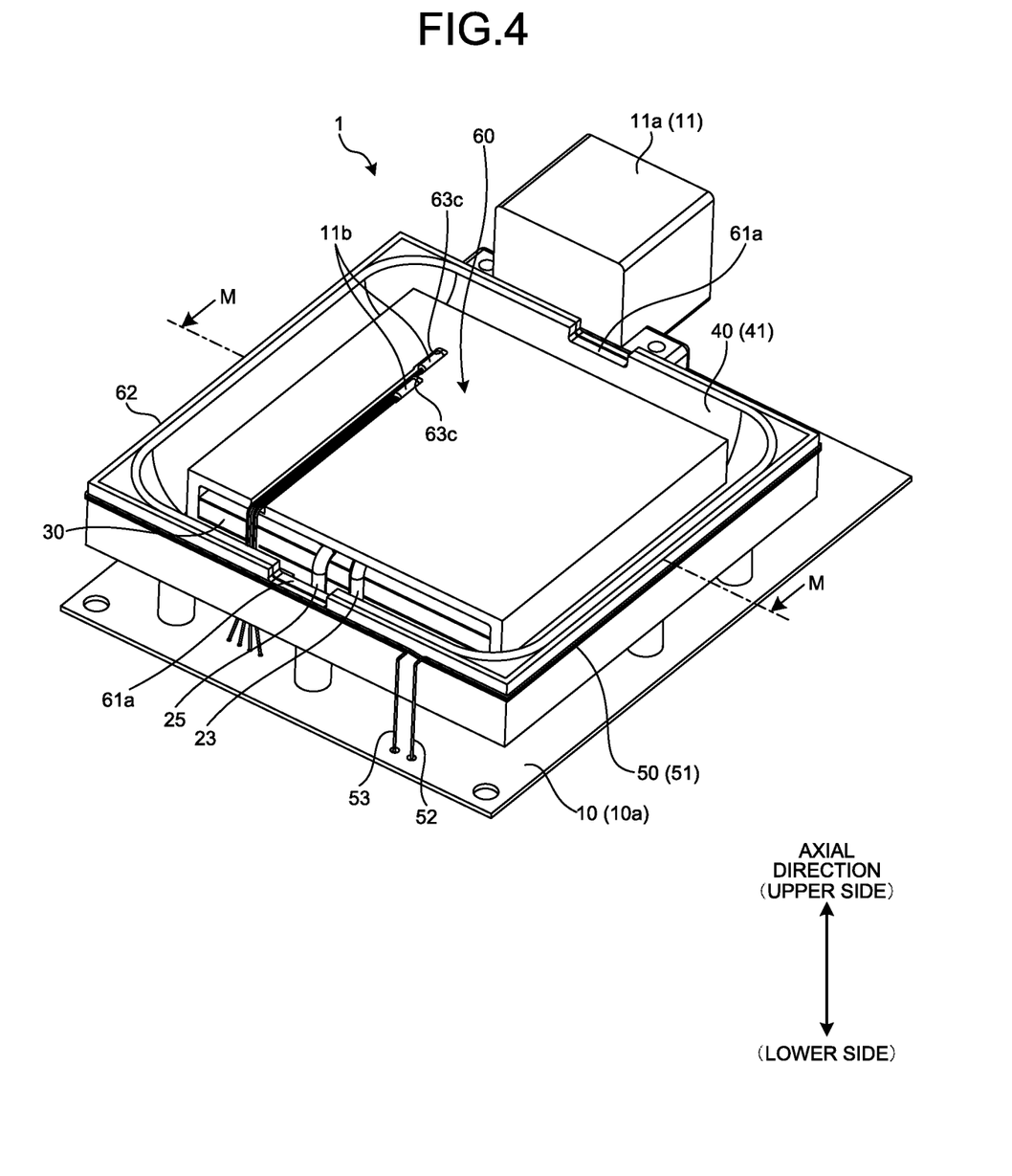
FIG. 4 is a perspective view illustrating a configuration example of the power transmission unit in a state in which an outer case is removed according to the embodiment.
Figure 5:
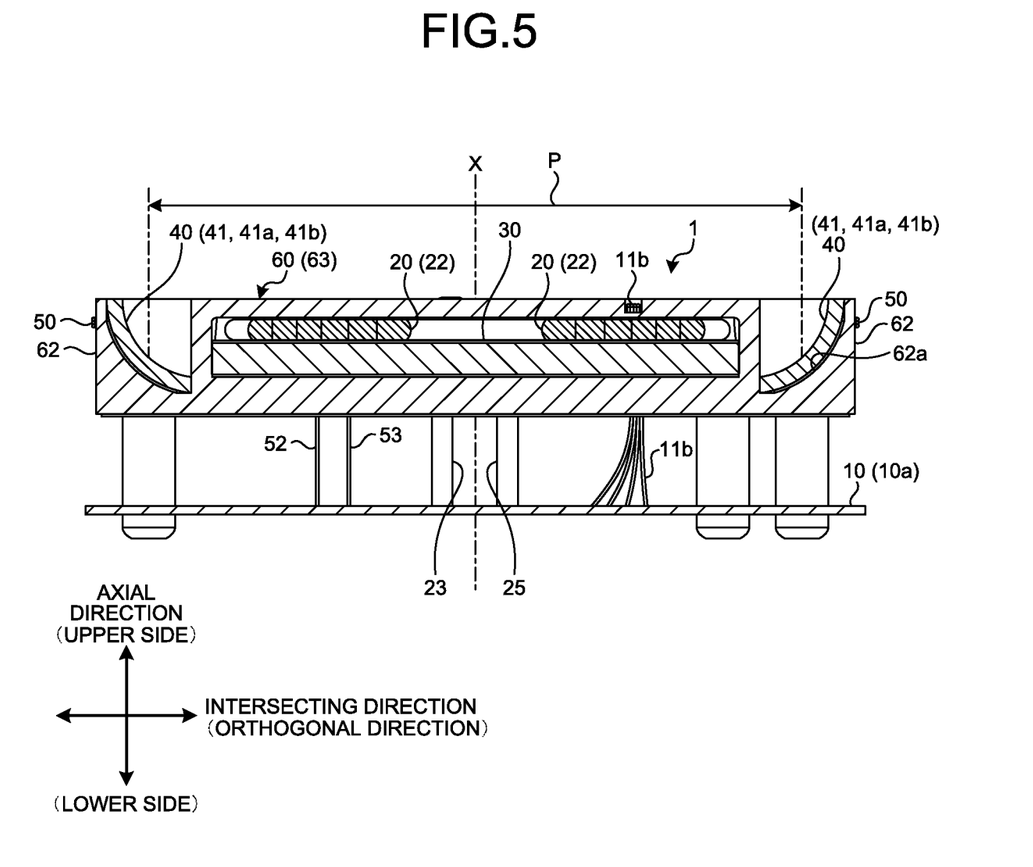
FIG. 5 is a cross-sectional view along M-M of FIG. 4 of the power transmission unit according to the embodiment.

The shielding member 40 is a member that shields excessive magnetic force (leakage magnetic field) of the power transmission coil 20 that may cause noise and the like. The shielding member 40 is, for example, made of metal having high conductivity such as copper and aluminum. The shielding member 40 includes a shield wall part 41 formed in an annular shape about the axis X, and both sides thereof in the axial direction are opened. The shield wall part 41 is, for example, formed by winding a long-length plate member around the axis X once. The shield wall part 41 is formed in a substantially rectangular shape when viewed from the axial direction, and four corner parts thereof are rounded. As illustrated in FIGS. 4 and 5, for example, the shield wall part 41 is arranged at a position along the intersecting direction to surround the power transmission coil 20 and the ferrite 30. That is, the shield wall part 41 is positioned outside to surround the power transmission coil 20 and the ferrite 30, and to be overlapped with the power transmission coil 20 and the ferrite 30 when viewed from the intersecting direction.

Figure 6:
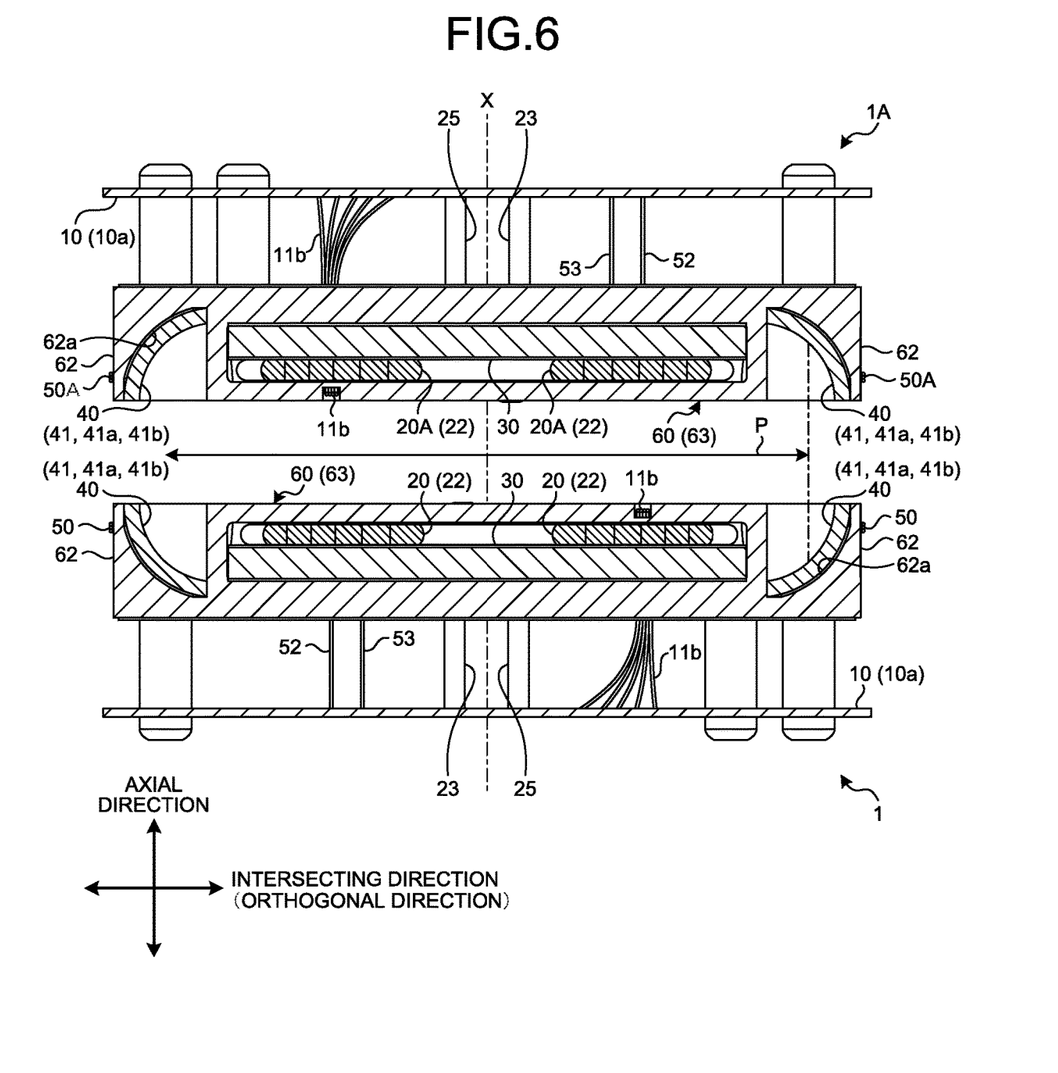
FIG. 6 is a cross-sectional view illustrating a power transmission unit on a power transmission side and a power reception side according to the embodiment.

The shield wall part 41 is formed in a divergent shape toward a counterpart power transmission coil 20A. That is, the shield wall part 41 is formed such that a gap P between wall surfaces 41a opposed to each other in the intersecting direction becomes wider from one side (lower side) toward the other side (upper side) of the axial direction (refer to FIGS. 5 and 6). Accordingly, the shield wall part 41 can prevent a line of magnetic force (line of magnetic induction) of the power transmission coil 20 from being orthogonal thereto. Thus, the shield wall part 41 can prevent an eddy current from flowing, the eddy current generating a magnetic field that counteracts variation in the magnetic field caused by the power transmission coil 20, so that power transmission efficiency can be prevented from being deteriorated. A cross-sectional shape along the axial direction of the shield wall part 41 (a cut part 41b) is formed in an arc shape curved toward the outside of the shield wall part 41. Accordingly, the shield wall part 41 can further prevent the eddy current from flowing.

The communication coupler 50 is an antenna that transmits and receives a signal. The communication coupler 50 is formed in an annular shape about the axis X. The communication coupler 50 is, for example, formed such that an antenna wire 51 is wound around the axis X a plurality of times (for example, three times) in a spiral manner. In the communication coupler 50, a first end part 52 as an end on a winding start side of the antenna wire 51 and a second end part 53 as an end on a winding finish side of the antenna wire 51 are connected to the substrate 10. The communication coupler 50 is formed in a substantially rectangular shape when viewed from the axial direction. The communication coupler 50 is arranged at a position along the intersecting direction to surround the power transmission coil 20. That is, the communication coupler 50 is positioned outside to surround the power transmission coil 20. The shielding member 40 is arranged between the communication coupler 50 and the power transmission coil 20 in the intersecting direction. Due to this, the magnetic force caused by the power transmission coil 20 can be prevented from influencing the communication coupler 50. Thus, the communication coupler 50 can prevent a characteristic from being changed and suppress a signal loss, so that communication quality can be prevented from being deteriorated.

The inner case 60 is a member housed in the outer case 70. The inner case 60 is made of an insulating synthetic resin and the like, and is molded by known injection molding. The inner case 60 defines a relative position of the substrate 10, the power transmission coil 20, and the ferrite 30 so as to allow the transmission of electric power with the counterpart power transmission coil 20A, and defines a relative position of the shielding member 40 and the communication coupler 50 so as to allow the communication with a counterpart communication coupler 50A serving as a counterpart communication part. The substrate 10, the power transmission coil 20, the ferrite 30, the shielding member 40, and the communication coupler 50 are assembled to the inner case 60.

The inner case 60 includes a supporting plate 61, an erected wall part 62, and a housing chamber 63. The supporting plate 61 is arranged to intersect with the axis X. The erected wall part 62 is erected from the supporting plate 61, and arranged in an annular shape about the axis X. The erected wall part 62 is formed in a substantially rectangular shape when viewed from the axial direction. The shape of an outer circumference of the erected wall part 62 is the same as the shape of an inner circumference of the communication coupler 50. The communication coupler 50 is mounted on the erected wall part 62, for example, by being wound around an outer face of the erected wall part 62. The shape of an inner circumference of the erected wall part 62 is the same as the shape of an outer circumference of the shielding member 40. The erected wall part 62 includes, in the inside thereof, a supporting part 62a having a curved shape for supporting an outer face of the shielding member 40. The erected wall part 62 supports the shielding member 40 to be mounted with the supporting part 62a. For example, the shielding member 40 is mounted on the erected wall part 62 such that the shielding member 40 is attached to the supporting part 62a with adhesive tape and the like (not illustrated). A notch part 61a is arranged on an upper edge in the axial direction of the erected wall part 62. The notch part 61a is formed by cutting a notch into part of the upper edge in the axial direction of the erected wall part 62. Accordingly, the notch part 61a can cause a potting material and a mold material to easily flow into the inner case 60.

The housing chamber 63 is formed in a rectangular parallelepiped shape, and arranged inside the erected wall part 62. The housing chamber 63 includes a space part 63a for housing the power transmission coil 20, an insertion port 63b for inserting the power transmission coil 20 into the space part 63a, and an attachment part 63c for attaching a thermistor for measuring temperature of the power transmission coil 20 and detecting a foreign substance (for example, a metal foreign substance) present between the housing chamber 63 and the outer case 70. In the housing chamber 63, the power transmission coil 20 is inserted into the space part 63a through the insertion port 63b, and the inserted power transmission coil 20 is housed in the space part 63a. In the housing chamber 63, the thermistor for measuring the temperature of the power transmission coil 20 housed in the space part 63a and detecting a foreign substance present between the housing chamber 63 and the outer case 70 is attached to the attachment part 63c. To enable the power transmission coil 20 to be inserted into the space part 63a through the insertion port 63b, the inner case 60 is configured such that a part 60a on the insertion port 63b side can be separated from a main body part 60b.

The outer case 70 is a housing that covers the inner case 60. The outer case 70 is made of an insulating synthetic resin and the like, and is molded by known injection molding. The outer case 70 includes, for example, an upper case 71 arranged on an upper side in the axial direction, and a lower case 72 arranged on a lower side in the axial direction. The outer case 70 is formed in a box shape by assembling the upper case 71 with the lower case 72 in the axial direction. In the outer case 70, a connector opening 73 is arranged for exposing a connector connection part 11a arranged on the substrate 10. The outer case 70 covers the entire inner case 60 with the upper case 71 and the lower case 72 in a state in which the substrate 10, the power transmission coil 20, the ferrite 30, the shielding member 40, and the communication coupler 50 are assembled to the inner case 60.

Next, the following describes a method of manufacturing the power transmission coil 20. The power transmission coil 20 is manufactured by using a jig 200 illustrated in FIG. 8. The jig 200 includes a first flat plate member 201 formed in a flat plate shape, a second flat plate member 202 formed in a flat plate shape, a rod-like member 203 formed in a rod shape, a ring member formed in an annular shape (not illustrated), and an external shape defining member 207.

Figure 8:
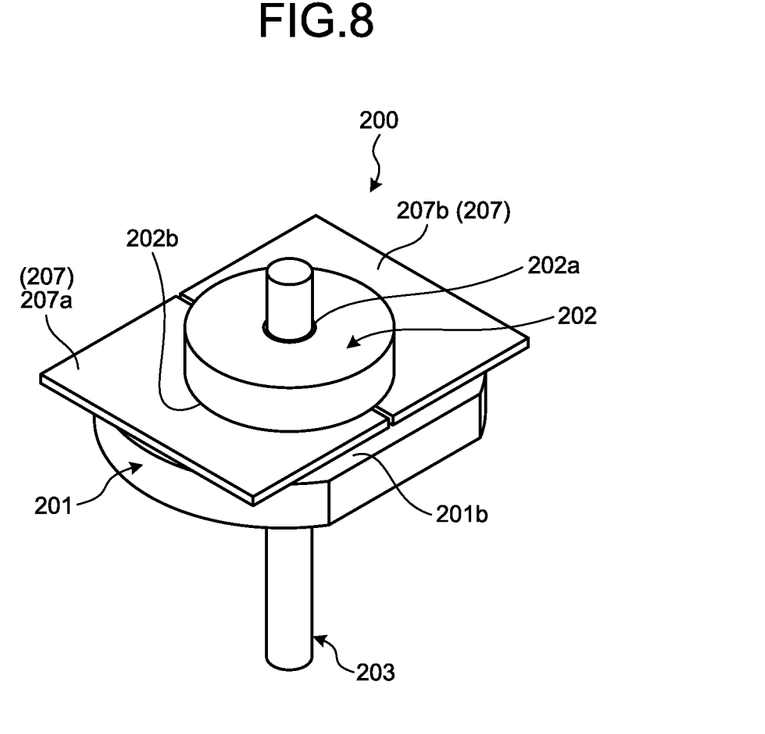
FIG. 8 is a perspective view illustrating an assembled jig for manufacturing the power transmission coil according to the embodiment.

The first flat plate member 201 includes a hole part (not illustrated) into which the rod-like member 203 is inserted, and a first compression plane part 201b that compresses the coil winding part 22.

The second flat plate member 202 is formed to have the same size as that of the external shape of the coil winding part 22, and includes a hole part 202a into which the rod-like member 203 is inserted and a second compression plane part 202b that compresses the coil winding part 22.

The rod-like member 203 is a member arranged to cause the first compression plane part 201b of the first flat plate member 201 is opposed to the second compression plane part 202b of the second flat plate member 202 in a slidable manner.

The ring member is arranged between the first compression plane part 201b and the second compression plane part 202b, and defines an inner diameter of the coil winding part 22. In the ring member, the conductor wire 21 is wound around an outer circumference of the ring member in a spiral shape.

The external shape defining member 207 is a member for defining the external shape of the coil winding part 22. The external shape defining member 207 includes a first external shape defining part 207a that defines a half of the external shape of the coil winding part 22, and a second external shape defining part 207b that defines the other half of the external shape of the coil winding part 22. By combining the first external shape defining part 207a and the second external shape defining part 207b, the external shape defining member 207 defines the entire circumference of the external shape of the coil winding part 22.

Figure 9:
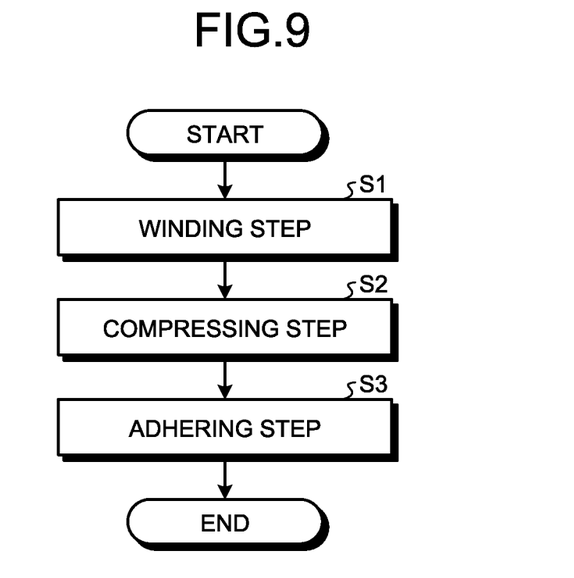
FIG. 9 is a flowchart illustrating a method of manufacturing the power transmission coil according to the embodiment.

The power transmission coil 20 is manufactured by using the jig 200 configured as described above. The method of manufacturing the power transmission coil 20 includes, for example, a winding step, a compressing step, and an adhering step as illustrated in FIG. 9. At the winding step, first, the first flat plate member 201 and the second flat plate member 202 are arranged to be opposed to each other in a slidable manner (Step S1). For example, a hole part 101a of the first flat plate member 201 is passed through the rod-like member 203 from one side, the ring member is passed through the rod-like member 203 from the other side to be laminated on the first flat plate member 201, and the hole part 202a of the second flat plate member 202 is passed through the rod-like member 203 from the other side to be laminated on a ring member 104. At the winding step, the conductor wire 21 is tensioned and wound, in a spiral shape, around the outer circumference of the ring member arranged on the rod-like member 203 between the first flat plate member 201 and the second flat plate member 202 to form the coil winding part 22. The external shape defining member 207 is mounted between the first flat plate member 201 and the second flat plate member 202 with a bolt 107c to define the external shape of the coil winding part 22.

Next, at the compressing step, the coil winding part 22 is compressed with the first flat plate member 201 and the second flat plate member 202 from the axial direction (Step S2). For example, the first compression plane part 201b and the second compression plane part 202b are brought closer to each other at a distance substantially equal to the thickness of the ring member, and the coil winding part 22 is compressed in the axial direction.

Next, at the adhering step, pieces of the conductor wire 21 of the coil winding part 22 adhere to each other with an adhesive member (Step S3). For example, at the adhering step, the coil winding part 22 is heated to melt the adhesive member previously arranged on the conductor wire 21, and the pieces of the conductor wire 21 of the coil winding part 22 and the intermediate part 24 adhere to each other with the adhesive member. Accordingly, the power transmission coil 20 in which the inner diameter, the outer diameter, and the thickness H1 of the coil winding part 22 are constant can be manufactured.

As described above, the power transmission unit 1 according to the embodiment includes: the communication coupler 50 that is formed in an annular shape about the axis X and arranged to surround the power transmission coil 20 at a position along the intersecting direction intersecting with the axis X; and the shielding member 40 that is formed in an annular shape about the axis X and arranged between the power transmission coil 20 and the communication coupler 50 in the intersecting direction. Due to this, in the power transmission unit 1, the communication coupler 50 is arranged to surround the power transmission coil 20, so that the size of the unit can be prevented from being increased. The shielding member 40 is arranged between the power transmission coil 20 and the communication coupler 50, so that the magnetic force caused by the power transmission coil 20 can be prevented from influencing the communication coupler 50. Thus, the communication coupler 50 can prevent a characteristic from being changed and suppress a signal loss.

Figure 7:
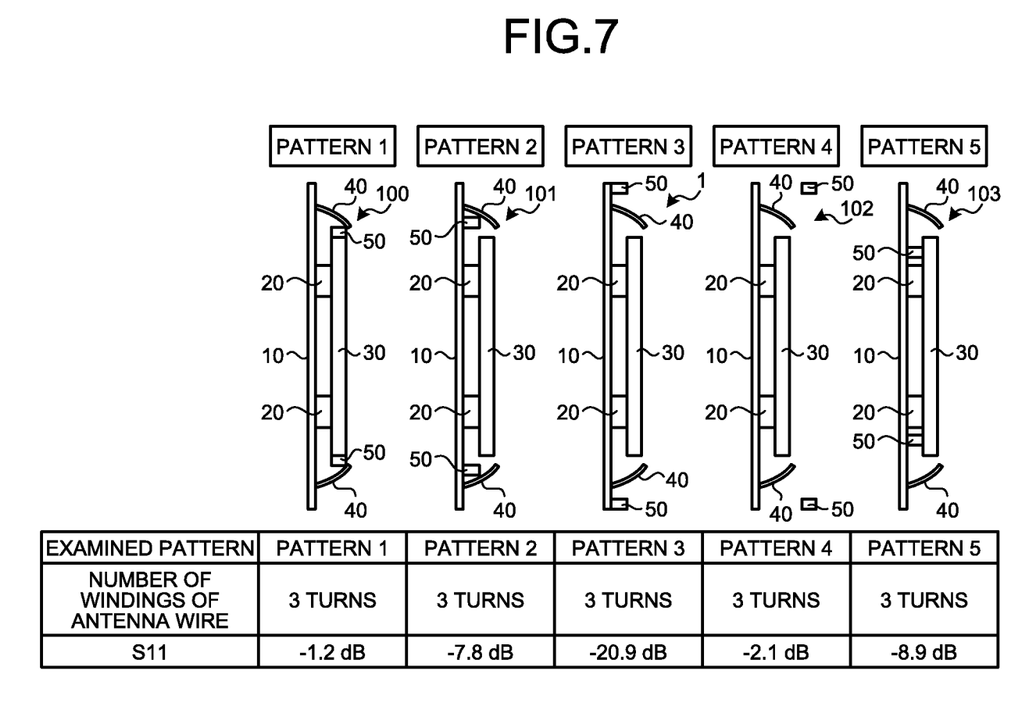
FIG. 7 is a diagram illustrating communication performance of the power transmission unit according to the embodiment and a power transmission unit according to a comparative example.

FIG. 7 illustrates communication performance of the power transmission unit 1 according to the embodiment and power transmission units 100, 101, 102, and 103 according to comparative examples, and schematically illustrates each of the power transmission units 1, 100, 101, 102, and 103. In the example illustrated in FIG. 7, the number of windings of the antenna wire 51 of the communication coupler 50 is assumed to be three turns. In the power transmission unit 100 according to the comparative example, the communication coupler 50 is arranged to surround the ferrite 30, and the shielding member 40 is arranged outside the power transmission coil 20 and the communication coupler 50 (pattern 1). In the power transmission unit 101 according to the comparative example, the communication coupler 50 is arranged to surround the power transmission coil 20, and the shielding member 40 is arranged outside the power transmission coil 20 and the communication coupler 50 (pattern 2). In the power transmission unit 102 according to the comparative example, the communication coupler 50 is arranged on an upper side in the axial direction of the shielding member 40, and the shielding member 40 is arranged inside the communication coupler 50 (pattern 4). In the power transmission unit 103 according to the comparative example, the communication coupler 50 is arranged to be closer to the power transmission coil 20 as compared with the power transmission unit 101 (pattern 5).

In the power transmission unit 1 (pattern 3) according to the embodiment, a parameter S11 indicating a reflection characteristic of a signal among S-parameters is the smallest value as compared with those of the power transmission units 100 to 103, and communication quality can be prevented from being deteriorated while preventing the size of the unit from being increased.

The power transmission unit 1 includes: the inner case 60 to which the substrate 10, the power transmission coil 20, the ferrite 30, the shielding member 40, and the communication coupler 50 are assembled, the inner case 60 defining a relative position of the substrate 10, the power transmission coil 20, the ferrite 30, the shielding member 40, and the communication coupler 50 so as to allow the transmission of electric power with the counterpart power transmission coil 20A and allowing the communication with the counterpart communication coupler 50A; and the outer case 70 that covers the inner case 60 to which the substrate 10, the power transmission coil 20, the ferrite 30, the shielding member 40, and the communication coupler 50 are assembled. Accordingly, in the power transmission unit 1, the inner case 60 can be housed in the outer case 70 in a state in which constituent parts including the substrate 10, the power transmission coil 20, the ferrite 30, the shielding member 40, and the communication coupler 50 are positioned and assembled to the inner case 60. Thus, for example, the power transmission unit 1 can easily and correctly define the relative position of the constituent parts and easily hold the constituent parts as compared with a case in which the constituent parts are directly assembled to the inside of the outer case 70. Due to this, the power transmission unit 1 can correctly define a relative position with respect to constituent parts of a counterpart power transmission unit 1A. Thus, the power transmission unit 1 can prevent power transmission efficiency from being deteriorated, and can prevent communication quality from being deteriorated.

In the power transmission unit 1, the inner case 60 includes: the supporting plate 61 arranged to intersect with the axis X; the erected wall part 62 that is erected from the supporting plate 61 to be arranged in an annular shape about the axis X, in which the communication coupler 50 is wound around the outer face thereof to be mounted on the outer face and the shielding member 40 is mounted on the inner face thereof; and the housing chamber 63 that is arranged inside the erected wall part 62 and includes the space part 63a in which the power transmission coil 20 and the ferrite 30 are housed. Accordingly, the inner case 60 can hold the shielding member 40 and the communication coupler 50 with the erected wall part 62, and can hold the power transmission coil 20 and the ferrite 30 with the housing chamber 63. The inner case 60 can define the position of the shielding member 40 and the communication coupler 50 with the erected wall part 62, and can define the position of the power transmission coil 20 and the ferrite 30 with the housing chamber 63. For example, by changing the thickness in the intersecting direction of the erected wall part 62 of the inner case 60, the positional relation in the intersecting direction between the shielding member 40 and the communication coupler 50 can be changed.

In the power transmission unit 1, the shielding member 40 includes the shield wall part 41 that is arranged at the position along the intersecting direction to surround the power transmission coil 20 so as to shield the magnetic force generated by the power transmission coil 20. The shield wall part 41 is formed so that the gap P between the wall surfaces 41a opposed to each other in the intersecting direction is widened from one side toward the other side of the axial direction. Accordingly, the shielding member 40 can prevent the line of magnetic force of the power transmission coil 20 from being orthogonal to the wall surface 41a of the shield wall part 41. Thus, the shielding member 40 can prevent an eddy current from being generated, and can prevent power transmission efficiency from being deteriorated. In this way, the shielding member 40 can prevent power transmission efficiency from being deteriorated with a simple configuration without adding other components. The shielding member 40 can prevent the shielding member 40 from generating heat.

The power transmission unit 1 according to the embodiment includes: the inner case 60 to which the substrate 10, the power transmission coil 20, and the ferrite 30 are assembled, the inner case 60 defining a relative position of the substrate 10, the power transmission coil 20, and the ferrite 30 so as to allow the transmission of electric power with the counterpart power transmission coil 20A; and the outer case 70 that covers the inner case 60 to which the substrate 10, the power transmission coil 20, and the ferrite 30 are assembled. Accordingly, in the power transmission unit 1, the inner case 60 can be housed in the outer case 70 in a state in which the constituent parts including the substrate 10, the power transmission coil 20, and the ferrite 30 are positioned and assembled to the inner case 60. Thus, for example, the power transmission unit 1 can easily and correctly define the relative position of the constituent parts and easily hold the constituent parts as compared with a case in which the constituent parts are directly assembled to the inside of the outer case 70. Due to this, the power transmission unit 1 can correctly define a relative position with respect to the constituent parts of the counterpart power transmission unit 1A. Thus, the power transmission unit 1 can prevent power transmission efficiency from being deteriorated.

In the power transmission unit 1, the inner case 60 further defines the relative position of the shielding member 40 and the communication coupler 50, thereby allowing communication with the counterpart communication coupler 50A, and the shielding member 40 and the communication coupler 50 are assembled to the inner case 60. Due to this, in the power transmission unit 1, the inner case 60 can be housed in the outer case 70 in a state in which the constituent parts including the shielding member 40 and the communication coupler 50 are assembled to the inner case 60. Thus, the power transmission unit 1 can easily and correctly define the relative position of the constituent parts and easily hold the constituent parts, so that communication quality can be prevented from being deteriorated.

In the power transmission unit 1, the substrate 10 is assembled to the inner case 60 via a substantially cylindrical part opposite to the erected wall part 62 of the supporting plate 61. Accordingly, by changing the length in the axial direction of the substantially cylindrical part, the inner case 60 can define a relative position of the power transmission coil 20, the communication coupler 50, and the substrate 10.

In the power transmission coil 20 according to the embodiment, the thickness H1 in the axial direction of the coil winding part 22 is smaller than the outer diameter H2 of the winding start end part 23 and the outer diameter H3 of the winding finish end part 25. Accordingly, the coil winding part 22 of the power transmission coil 20 is compressed along the axial direction, so that a cross-sectional shape of the conductor wire 21 of the coil winding part 22 is deformed from an annular shape into a rectangular shape and the like to close a space between adjacent pieces of the conductor wire 21, and the power transmission coil 20 can be formed in a plate shape. Thus, the power transmission coil 20 can make the thickness H1 in the axial direction of the coil winding part 22 uniform. Due to this, the power transmission coil 20 can suppress fluctuation in the coil shape, and reduce tolerances of the inductance value and a high-frequency resistance value. Thus, the power transmission coil 20 can secure appropriate coil performance, and prevent power transmission efficiency from being deteriorated. The external shape of the power transmission coil 20 can be made small. When power transmission coils 20 are arranged on the power transmission side and the power reception side to be opposed to each other, a gap between the power transmission coil 20 on the power transmission side and the power transmission coil 20 on the power reception side can be accurately defined. Accordingly, the power transmission coil 20 can prevent power transmission efficiency from being deteriorated.

In the power transmission coil 20, the conductor wire 21 is a litz wire obtained by intertwisting a plurality of conductor elemental wires. In a conventional power transmission coil, the shape of the coil winding part 22 may fluctuate due to a diameter or a way of intertwisting of the conductor elemental wires of the litz wire. On the other hand, in the power transmission coil 20 according to the embodiment, even when the litz wire is used as the conductor wire 21, a space within the litz wire can be reduced and the thickness H1 of the coil winding part 22 can be made uniform, so that the shape of the coil winding part 22 can be prevented from fluctuating.

In the power transmission coil 20, the winding start end part 23 and the winding finish end part 25 are positioned outside the coil winding part 22 when viewed from the axial direction. Accordingly, a coupling coefficient of the power transmission coil 20 can be increased as compared with a case in which the winding start end part 23 is positioned inside the coil winding part 22 and the winding finish end part 25 is positioned outside the coil winding part 22 as in the case of a conventional power transmission coil. For example, as a result of experiment, the coupling coefficient of the conventional power transmission coil is 0.339, and the coupling coefficient of the power transmission coil 20 according to the embodiment is 0.562.

In the power transmission coil 20, the conductor wire 21 of the coil winding part 22 is coated with the adhesive member. Accordingly, the coil winding part 22 can maintain, to be constant, the shape of the coil winding part 22 that is compressed to be relatively thin.

The method of manufacturing the power transmission coil 20 includes the winding step and the compressing step. At the winding step, the conductor wire 21 is tensioned and wound, in a spiral shape, around the axis X of the rod-like member 203 between the first flat plate member 201 and the second flat plate member 202 that are arranged on the rod-like member 203 to be opposed to each other in a slidable manner, thereby the coil winding part 22 is formed. At the compressing step, the coil winding part 22 is compressed with the first flat plate member 201 and the second flat plate member 202 from the axial direction. Accordingly, with the method of manufacturing the power transmission coil 20, the thickness H1 in the axial direction of the coil winding part 22 can be made uniform, and the power transmission coil 20 can be manufactured while securing appropriate coil performance.

Modification

Next, the following describes a modification of the embodiment. In the description, the substrate 10 is assumed to be a printed circuit board; however, the embodiment is not limited thereto. For example, the substrate 10 may be an insert busbar substrate and the like in which a busbar made of a conductive metallic material is incorporated in an insulating resin material and various circuits are configured by the busbar.

The shape of the power transmission coil 20 is not limited to a spiral shape. The power transmission coil 20 may be, for example, what is called a solenoid-type power transmission coil. That is, the power transmission coil 20 may be a power transmission coil that is wound around ferrite (not illustrated) in a spiral manner. In this case, the solenoid-type power transmission coil is arranged so that a coil axis direction intersects with (for example, is orthogonal to) the axis X.

In the exemplified power transmission coil 20, the coil winding part 22 is compressed and coated with the adhesive member. However, the embodiment is not limited thereto. The coil winding part 22 of the power transmission coil 20 is not necessarily compressed and not necessarily coated with the adhesive member.

The exemplified ferrite 30 is formed in a rectangular plate shape; however, the embodiment is not limited thereto. For example, the ferrite 30 may be formed in a circular plate shape, or a plurality of small-sized blocks of ferrite may be arranged to form one piece of ferrite.

In the example described above, both sides in the axial direction of the shielding member 40 are opened. However, the embodiment is not limited thereto. For example, a side of the shielding member 40 on the ferrite 30 side in the axial direction may be closed.

In the example described above, the cross-sectional shape (cut part 41b) along the axial direction of the shielding member 40 is formed in an arc shape; however, the embodiment is not limited thereto. For example, the cross-sectional shape along the axial direction of the shield wall part 41 may be formed in a rectangular shape.

In the example described above, the outer case 70 is formed in a box shape and completely covers the inner case 60. However, the embodiment is not limited thereto. For example, the outer case 70 may be arranged to cover the inner case 60 from an upper side in the axial direction in a state in which the inner case 60 to which the constituent parts are assembled is installed on an installation surface.

In the example described above, the substrate 10, the power transmission coil 20, the ferrite 30, the shielding member 40, and the communication coupler 50 are assembled to the inner case 60 with the adhesive tape and the like. However, the embodiment is not limited thereto. For example, constituent parts including the substrate 10, the power transmission coil 20, the ferrite 30, the shielding member 40, and the communication coupler 50 may be assembled to the inner case 60 by insert molding. In this case, a mold for the inner case 60 used in insert molding can be simplified as compared with a case of directly assembling the constituent parts to an outer case (not illustrated) by insert molding. Accordingly, manufacturing cost for the power transmission unit 1 can be reduced.

The substrate 10 may be assembled to the inner case 60 on an opposite side of the erected wall part 62 of the supporting plate 61 via a plurality of spacers (not illustrated). Each of the spacers is a member that prevents the inner case 60 from interfering with the electronic component 11 of the substrate 10. Each spacer is erected from a mounting surface 10a of the substrate 10, and a bolt fastening hole (not illustrated) is arranged at an end of the spacer on the inner case 60 side. A plurality of hole parts (not illustrated) for inserting a bolt are arranged on the supporting plate 61 of the inner case 60. In the inner case 60, each hole part for inserting a bolt is aligned with the bolt fastening hole of each spacer. In the inner case 60, a plurality of bolts (not illustrated) are inserted into the hole parts for inserting a bolt, and the inserted bolts are fastened to the respective bolt fastening holes to assemble the substrate 10 to the inner case 60. In the inner case 60, the supporting plate 61 of the inner case 60 is assembled to the substrate 10.

In the example described above, the adhesive member previously arranged on the conductor wire 21 is melt to fuse the coil winding part 22. However, the embodiment is not limited thereto. For example, the adhesive member may be applied to the coil winding part 22 formed at the winding step, and pieces of the conductor wire 21 of the coil winding part 22 may adhere to each other with the applied adhesive member.

In the example described above, in the power transmission coil 20, the winding start end part 23 and the winding finish end part 25 are positioned outside the coil winding part 22 when viewed from the axial direction. However, the embodiment is not limited thereto. For example, the winding start end part 23 and the winding finish end part 25 may be positioned inside the coil winding part 22 when viewed from the axial direction. Accordingly, the coupling coefficient of the power transmission coil according to the modification can be increased as compared with a case in which the winding start end part 23 is positioned inside the coil winding part 22 and the winding finish end part 25 is positioned outside the coil winding part 22 as in the case of a conventional power transmission coil. For example, as a result of experiment, the coupling coefficient of the conventional power transmission coil is 0.361, and the coupling coefficient of the power transmission coil according to the modification is 0.610.

In the example described above, the coil winding part 22 is formed at the winding step, and the coil winding part 22 is compressed at the compressing step after the winding step. However, the embodiment is not limited thereto. For example, the winding step and the compressing step may be performed at the same time. For example, the conductor wire 21 may be wound while being compressed with the first flat plate member 201 and the second flat plate member 202.

In the power transmission unit according to the present embodiment, the communication part is formed in an annular shape about the axis to surround the power transmission coil, and the shielding member is formed in an annular shape about the axis and arranged between the power transmission coil and the communication part in the intersecting direction to shield the magnetic force generated by the power transmission coil. Due to this, the power transmission unit can prevent the size of the unit from being increased, and prevent the magnetic force caused by the power transmission coil from influencing the communication part. As a result, the power transmission unit can prevent communication quality from being deteriorated while preventing the size of the unit from being increased.

A power transmission coil includes: a coil winding part in which a conductor wire is arranged in a spiral shape about an axis; a winding start end part as an end of the conductor wire on a winding start side; and a winding finish end part as an end of the conductor wire on a winding finish side, wherein a thickness of the coil winding part in an axial direction along the axis is smaller than an outer diameter of the winding start end part and an outer diameter of the winding finish end part.

The conductor wire is a litz wire obtained by intertwisting a plurality of conductor elemental wires.

The winding start end part and the winding finish end part are positioned outside or inside the coil winding part when viewed from the axial direction.

The conductor wire of the coil winding part is coated with an adhesive member.

A method of manufacturing a power transmission coil includes: a winding step of forming the coil winding part by tensioning and winding the conductor wire in a spiral shape around the axis of a rod-like member between a first flat plate member and a second flat plate member that are arranged on the rod-like member to be opposed to each other in a slidable manner; and a compressing step of compressing the coil winding part with the first flat plate member and the second flat plate member from an axis direction along the axis.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission unit comprising:
a power transmission coil that transmits electric power in a non-contact manner;
a communication part that is formed in an annular shape about an axis, arranged to surround the power transmission coil, and transmits and receives a signal; and
a shielding member that is formed in an annular shape about the axis, arranged between the power transmission coil and the communication part in an intersecting direction intersecting with the axis, and shields magnetic force generated by the power transmission coil, wherein
the shielding member is overlapped with the power transmission coil and both sides thereof in an axial direction along the axis direction are opened and co-planar with at least parts of the power transmission coil and the communication part when viewed from the intersecting direction.

2. The power transmission unit according to claim 1, wherein
the shielding member includes a shield wall part that is arranged at a position along the intersecting direction to surround the power transmission coil so as to shield magnetic force generated by the power transmission coil, and
the shield wall part is formed such that a gap between wall surfaces opposed to each other in the intersecting direction is widened from one side toward the other side of the axial direction.

3. The power transmission unit according to claim 1, further comprising:
a magnetic member that is arranged on the power transmission coil and includes a magnetic material;
the magnetic member is provided on an opening side of the shielding member opposite to a counterpart power transmission coil.

4. The power transmission unit according to claim 1,
wherein the power transmission coil is configured to transmit the electric power in the axial direction,
wherein the intersecting direction is perpendicular to the axial direction, and
wherein the axial direction is perpendicular to a plane on which the shielding member is co-planar with at least the parts of the power transmission coil and the communication part.

* * * * *